United States Patent [19]

Mizuguchi et al.

[11] Patent Number: 5,284,881
[45] Date of Patent: Feb. 8, 1994

[54] COMPOSITE HOLLOW PARTICLES

[75] Inventors: Katsumi Mizuguchi, Ibaragi; Koichi Saito; Shinichi Ishikura, both of Kyoto, all of Japan

[73] Assignee: Nippon Paint Co., Ltd., Osaka, Japan

[21] Appl. No.: 962,017

[22] Filed: Oct. 15, 1992

Related U.S. Application Data

[63] Continuation of Ser. No. 578,304, Sep. 5, 1990, abandoned.

[30] Foreign Application Priority Data

Sep. 6, 1989 [JP] Japan ............................ 1-232375

[51] Int. Cl.$^5$ .............................................. C08J 9/224
[52] U.S. Cl. ...................................... 521/57; 427/180; 427/181; 427/213.3; 427/213.34; 427/213.36; 428/402; 428/404; 428/407; 521/56; 521/59; 521/60
[58] Field of Search ................... 427/180, 181, 231.3, 427/213.34, 213.36; 428/402, 404, 407; 521/64, 56, 60, 59, 57

[56] References Cited

U.S. PATENT DOCUMENTS

| | | | |
|---|---|---|---|
| 4,360,611 | 11/1982 | Wakimoto et al. | 523/216 |
| 4,798,691 | 1/1989 | Kasai et al. | 428/402 |
| 4,908,271 | 3/1990 | Kasai et al. | 428/402 |
| 4,952,651 | 8/1990 | Kasai et al. | 526/201 |
| 4,972,000 | 11/1990 | Kawashima et al. | 428/407 |
| 4,973,670 | 11/1990 | McDonald et al. | 428/407 |
| 4,988,567 | 1/1991 | Delgado | 521/64 |
| 4,994,322 | 2/1991 | Delgado et al. | 428/343 |
| 5,045,569 | 9/1991 | Delgado | 521/60 |

FOREIGN PATENT DOCUMENTS

| | | |
|---|---|---|
| 0173789 | 3/1986 | European Pat. Off. . |
| 0331421 | 9/1989 | European Pat. Off. . |
| 0335029 | 10/1989 | European Pat. Off. . |
| 0376684 | 7/1990 | European Pat. Off. . |

*Primary Examiner*—Morton Foelak
*Attorney, Agent, or Firm*—Wenderoth, Lind & Ponack

[57] ABSTRACT

Disclosed is composite hollow particles which are excellent in solvent resistance and mechanical stability and have strong walls and which can be easily synthesized. The composite hollow particles are prepared by uniformly dispersing the following ingredients in an aqueous medium;

(a) an ethylenically unsaturated monomer having at least two radical polymerizable double bonds in one molecule,
(b) another polymerizable monomer which is different from the monomer (a),
(c) organic particles having an average particle size of 0.01 to 5 micrometer,
(d) a initiator, and
(e) a dispersant, and then dispersion-polymerizing.

10 Claims, No Drawings

COMPOSITE HOLLOW PARTICLES

This application is a continuation of now abandoned application, Ser. No. 07/578,304, filed on Sep. 5, 1990, now abandoned.

FIELD OF THE INVENTION

The present invention relates to composite hollow particles which are composed of hollow particles having a particle size of 0.1 to 300 micrometer and organic particles having a particle size of 0.01 to 5 micrometer.

BACKGROUND OF THE INVENTION

There have been proposed many processes which produce porous particles or hollow particles, for example, (i) W/O/W suspension polymerization (see Japanese Kokai Publication (unexamined) 72003/1986), (ii) a method wherein a monomer mixture is mixed with an organic solvent and suspension-polymerized, followed by expanding the solvent out, and (iii) a method wherein two kinds of polymerization initiators which have different reaction temperature with each other are employed and polymerized.

However, in the process (i), a large amount of a surfactant remains in obtained particles, but it is very difficult to remove the surfactant from the particles. In the process (ii), the organic solvent which is unnecessary for a water based system remains and many efforts are required to remove it. In the process (iii), a particular reaction vessel is required, because the temperature of the second reaction reaches to approximate 150° C.

In view of encapsulization technique, capsules having inorganic walls and their producing methods have also been proposed, but the capsules have poor affinity with organic materials and therefore are difficult to mix with the organic materials. Also, since the walls are constituted through ion bonding, the water resistance of the capsules is very poor.

SUMMARY OF THE INVENTION

The present invention provides composite hollow particles which are excellent in solvent resistance and mechanical strength and which can be easily synthesized. Accordingly, the present invention provides composite hollow particles which are composed of hollow particles having a particle size of 0.1 to 300 micrometer and organic particles having a particle size of 0.01 to 5 micrometer.

The present invention also provides a process for preparing the composite hollow particles which comprises uniformly dispersing the following ingredients in an aqueous medium;
(a) an ethylenically unsaturated monomer having at least two radical polymerizable double bonds in one molecule,
(b) another polymerizable monomer which is different from the monomer (a),
(c) organic particles having an average particle size of 0.01 to 5 micrometer,
(d) an initiator, and
(e) a dispersant,
and then dispersion-polymerizing.

DETAILED DESCRIPTION OF THE INVENTION

According to the present invention, the ethylenically unsaturated monomer (a) having at least two radical polymerizable non-conjugated double bonds in one molecule includes an ester of an unsaturated carboxylic acid and a polyhydric alcohol, an ester of a polybasic acid and an unsaturated alcohol and an aromatic compound which is substituted with at least two vinyl groups. Typical examples of the monomers (a) are ethyleneglycol diacrylate, ethyleneglycol dimethacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol diacrylate, glycerol acroxydimethacrylate, 1,1,1-trishydroxymethylethane diacrylate, 1,1,1-trishydroxymethylethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane dimethacrylate, 1,1,1-trishydroxymethylpropane trimethacryalte, triallyl cyanulate, trially isocyanulate, trially trimellitate, diallyl terephthalate, diallyl phthalate, divinylbenzene and the like.

The polymerizable monomer (b) which is different from the monomer (a) of the present invention includes carboxylic group-containing monomers, such as acrylic acid, methacrylic acid, crotonic acid, itaconic acid, maleic acid, fumaric acid and the like; hydroxylic group-containing monomers, such as 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol and the like; nicrogen-containing alkyl (meth)acrylates, such as dimethaylaminoethyl (meth)acrylate and the like; amides, such as (meth)acrylamide and the like; nitriles, such as (meth)acrylonitrile and the like; (meth)acrylate, such as methyl (meth)acrylate, ethyl (meth)acrylate, n-butyl (meth)acrylate, 2-ethylhexyl (meth)acrylate and the like; aromatic compounds, such as styrene, alpha-methylstyrene, vinyltoluene, t-butylstyrene and the like; alpha-olefins, such as vinyl acetate, vinyl propionate and the like; dienes, such as butadiene and isoprene; and the like.

The organic polymer particles (c) having an average particle size of 0.01 to 5 micrometer of the present invention may be either crosslinked or not, and may be prepared by any methods. Preferred organic particles (c) are those described in U.S. Pat. Nos. 4,468,493, 4,461,870 and 4,530,946 which are herein incorporated. If the particles have a particle size of less than 0.01 micrometer, the obtained composite particles have very small hollow volume. If they have a particle size of more than 5 micrometer, no hollows are present in the obtained particles.

The initiator (d) of the present invention initiates polymerization and preferably is oil-soluble. Examples of such initiators are azo compounds, such as 2,2'-azobis (4-methoxy-2,4-dimethylvaleronitrile), 2,2'-azobis(2-cyclopropylpropionitrile), 2,2'-azobis(2,4-dimethylvaleronitrile), 2,2'-azobis(2-methylpropionitrile), 2,2'-azobisisobutylonitrile, 2,2'-azobis(2-methylbutylonitrile), 1,1'-azobis(cyclohexane-1-carbonitrile), 2-phenylazo-4-methoxy-2,4-dimethylvaleronitrile etc.; diacyl peroxides, such as isobutylperoxide, 2,4-dichlorobenzoylperoxide, o-methylbenzoylperoxide, lauroylperoxide etc.; percarbonates, such as di-3- methoxybutylperoxydicarbonate, bis(4-t-butylcyclohexyl) peroxydicarbonate, diisopropylperoxydicarbonate etc.; ketone peroxides, such as methyl ethyl ketone peroxide, methyl isobutyl ketone peroxide, cyclohexanone peroxide, methyl cyclohexanone peroxide etc.; hydroperoxides, such as 2,4,4-trimethyl pentyl-2-hydroperoxide, diisopropyl benzene hydroperoxide, cumene hydroperoxide etc.; dialkyl peroxides, such as dicumyl peroxide, 2,5-dimethyl-2,5-di(t-butylperoxy)-hexane, t-butyl cumyl peroxide, di-t-butyl peroxide, 2,5-dimethyl-2,5-di (t-butylperoxy)hexyne-3, tris(t-butyl peroxy)triazine etc.; peroxyketals, such as 1,1,-di-t-butyl peroxy-3,3,5-trimethyl chclohexane, 2,2-di(t-butyl peroxy)butane, 4,4-di-t-butyl peroxy valeric acid-n-butyl ester etc.; alkyl peresters, such as 2,4,4-trimethyl-pentyl peroxyphenoxyacetate, alpha-cumyl peroxyneodecanoate, t-butyl peroxypivalate, t-butyl peroxy-2-ethylhexanoate, di-t-butyl peroxyhexahydroterephthalate etc; and the like.

The dispersant (e) of the present invention has a function of dispersing the components (a) to (d) in an aqueous medium and may be assisted by a dispersion stabilizer and/or an emulsifier. The dispersant includes polyvinyl acetate or a modifier thereof (e.g. polyvinyl alcohol), and a polymer dispersant having a hydrophilic group and a hydrophobic groups. Typical examples of the dispersants are KM-11 (available from Nippon Synthetic Chemical Industry Co., Ltd.), NH-20 (available from Nippon Synthetic Chemical Industry Co., Ltd.), polyvinyl pyrrolidone, GH-17 (available from Nippon Synthetic Chemical Industry Co., Ltd.) and the like.

The aqueous medium of the present invention is generally water, especially deionized water. Water miscible organic solvent (e.g. alcohols, ketones) may be mixed thereto, if necessary.

A weight ratio of component (a) / component (b) is preferably 0.5/99.5 to 60/40. If the ratio is less than 0.5/99.5, crosslinking degree is poor, thus reducing void content. If it is more than 60/40, a yield of the hollow particles of the present invention is lowered.

An amount of the organic particles (c) is preferably 1 to 50% by weight, more preferably 5 to 30% by weight based on a total weight of the components (a) and (b). Amounts of less than 1% by weight reduce void content. If the amount is more than 50% by weight, it is difficult to uniformly mix the particles (c) with the monomers and the mixture is often made gel. Accordingly, the dispersion stability is deteriorated and its yield is also lowered.

An amount of the dispersant (d) is not limited, but preferably 1 to 20% by weight, preferably 2 to 15% by weight, based on the total weight of the components (a), (b) and (c). If it is less than 1% by weight, dispersion stability is poor. If it is more than 20% by weight, the reaction system is too viscous to stir the reactants.

In the preparation method of the composite hollow particles of the present invention, the above mentioned components (a) to (d) are mixed with the dispersant (e) and then dispersed. Dispersing can be carried out by usual methods, preferably by a homogenizer, a disper or a high speed emulsifier. The dispersed mixture is polymerized with stirring at a temperature of 50° to 95° C., preferably 60° to 85° C. for 2 to 20 hours, preferably 5 to 12 hours to obtain the composite hollow particles of the present invention.

The composite hollow particles of the present invention can be obtained by dispersion-polymerizing the monomers in the presence of the organic particles (c).

The phrase "hollow particles" herein is meant that one or more voids are present in the polymerized particle. The voids can be either closed cell or continuous cell. It is quite difficult to measure the void content of the hollow particles, but in the present invention, when the particle is cut and the cut surface is observed by an electron microscope, a quotient of the voids divided by the area of the whole cut surface is expressed as void content. It is desired that the void content is within the range of 1 to 95%, preferably 5 to 80%. The reason why the voids appear in the obtained polymerized particles is not understood, but it has only been found that the four components are dispersion-polymerized to form such polymerized particles having the voids.

The organic polymer particles (c) are present inside or outside the obtained hollow particles and may be present on or apart from the surface of the particles. In this context, the term "composite" herein is meant that the organic particles (c) having 0.05 to 5 micrometer particle size are present inside or outside the particle in any conditions.

The composite hollow particles can be very easily produced. The hollow particles are excellent in solvent resistance, mechanical strength and resilience, because the particles are obtained from the monomer having at least two polymerizable groups. The composite hollow particles are very useful for fillers of rubber or plastics, reinforcing agents, flatting agents of paint etc., additives, surface modifiers and ion-exchanging resin.

EXAMPLES

The present invention is illustrated by the following examples which, however, are not to be construed as limiting the present invention to their details.

Production Example 1

Preparation of an emulsifying agent used for producing organic particles (c)

A two liter flask equipped with a stirrer, a nitrogen gas introducing tube, a temperature controller, a condenser and a decanter was charged with 213 parts by weight of bishydroxyethyltaurine, 236 parts by weight of 1,6-hexanediol, 296 parts by weight of phthalic anhydride, 376 parts by weight of azelaic acid and 44 parts by weight of xylene and heated. The produced water was azeotropically distilled away with xylene. It was slowly heated to 210° C. over 3 hours from the reflux starting point and then reacted with stirring until an acid value of the content reached 125 (corresponding to carboxylic acid). The reaction mixture was cooled to 140° C., at which 500 parts by weight of Cardula E 10 (versatic acid glycidyl ester available from Shell Company) was added dropwise for 30 minutes. Mixing was kept for two hours.

Preparation of organic particles (c) are shown in Production Examples 2 to 12.

Production Example 2

A reaction vessel equipped with a stirrer, a condenser, a temperature controller and a nitrogen gas introducing tube was charged with 50 parts by weight of the emulsifying agent of Production Example 1, 5.0 parts by weight of dimethylethanolamine and 508 parts by weight of deionized water and heated to 80° C. with stirring. To the content, 80 parts by weight of the following initiator mixture was added and then the following monomer mixture was added dropwise for 60 minutes.

| | Parts by weight |
|---|---|
| Initiator mixture | |
| Azobiscyanovaleric acid | 2 |
| Deionized water | 100 |
| Dimethylethanolamine | 1.3 |
| Monomer mixture | |
| Methyl methacrylate | 100 |
| n-Butyl acrylate | 50 |
| Styrene | 200 |
| Ethyleneglycol dimethacrylate | 100 |

After the completion of the addition, 23.3 parts by weight of the remaining initiator mixture was added and mixing was continued for 30 minutes to terminate the reaction. The resultant emulsion was a micro-gel dispersion having an average particle size of 0.079 micrometer. The emulsion was spray-dried to obtain polymer particles.

Production Example 3

A reaction vessel equipped with a stirrer, a condenser, a temperature controller and a nitrogen gas introducing tube was charged with 10 parts by weight of sodium dodecylbenzenesulfonate and 4,000 parts by weight of deionized water and heated to 80° C. with stirring. To the content, 180 parts by weight of the following initiator mixture was added and then the following monomer mixture was added dropwise for 60 minutes.

| | Parts by weight |
|---|---|
| Initiator mixture | |
| Azobiscyanovaleric acid | 10 |
| Deionized water | 200 |
| Dimethylethanolamine | 10 |
| Monomer mixture | |
| Methyl methacrylate | 140 |
| n-Butyl acrylate | 50 |
| Styrene | 200 |
| Ethyleneglycol dimethacrylate | 100 |

After the completion of the addition, 40 parts by weight of the remaining initiator mixture was added and mixing was continued for 30 minutes to terminate the reaction. The resultant emulsion was subjected to filtration using a 400 mesh filter to obtain an emulsion having an average particle size of 0.21 micrometer. The emulsion was ultrafiltered and then spray-dried to obtain polymer particles.

Production Example 4

A reaction vessel equipped with a stirrer, a condenser, a temperature controller and a nitrogen gas introducing tube was charged with 1,000 parts by weight of deionized water and heated to 80° C. with stirring. To the content, 205 parts by weight of the following initiator mixture and 50 parts by weight of methyl methacrylate were added and then the following monomer mixture was added dropwise for 120 minutes.

| | Parts by weight |
|---|---|
| Initiator mixture | |
| Ammonium peroxosulfate | 5 |
| Deionized water | 200 |
| Monomer mixture | |
| Methyl methacrylate | 130 |
| n-Butyl acrylate | 50 |
| Styrene | 200 |
| Ethyleneglycol dimethacrylate | 120 |

After the completion of the addition, mixing was continued for 30 minutes to terminate the reaction. The resultant emulsion was a micro-gel dispersion having an average particle size of 0.51 micrometer. The emulsion was spray-dried to obtain polymer particles.

Production Example 5

A reaction vessel equipped with a stirrer, a condenser, a temperature controller and a nitrogen gas introducing tube was charged with 1,000 parts by weight of deionized water and heated to 80° C. with stirring. To the content, 205 parts by weight of the following initiator mixture and 50 parts by weight of methyl methacrylate were added and then the following monomer mixture was added dropwise for 120 minutes.

| | Parts by weight |
|---|---|
| Initiator mixture | |
| Ammonium peroxosulfate | 5 |
| Deionized water | 200 |
| Monomer mixture | |
| Methyl methacrylate | 200 |
| n-Butyl acrylate | 60 |
| Styrene | 200 |
| Ethyleneglycol dimethacrylate | 40 |

After the completion of the addition, mixing was continued for 60 minutes to terminate the reaction. The resultant emulsion was a micro-gel dispersion having an average particle size of 0.53 micrometer. The emulsion was spray-dried to obtain polymer particles.

Production Example 6

A reaction vessel equipped with a stirrer, a condenser, a temperature controller and a nitrogen gas introducing tube was charged with 1,000 parts by weight of deionized water and heated to 80° C. with stirring. To the content, 170 parts by weight of the emulsion of Production Example 4 and 205 parts by weight of the following initiator mixture were added and then the following monomer mixture was added dropwise for 120 minutes.

| | Parts by weight |
|---|---|
| Initiator mixture | |
| Ammonium peroxosulfate | 5 |
| Deionized water | 200 |
| Monomer mixture | |
| Methyl methacrylate | 140 |
| n-Butyl acrylate | 60 |
| Styrene | 200 |
| Ethyleneglycol dimethacrylate | 100 |

After the completion of the addition, mixing was continued for 60 minutes to terminate the reaction. Agglomerate in the resultant solution was filtered off with 400 mesh filter to obtain an emulsion having an average particle size of 1.1 micrometer. The emulsion was spray-dried to obtain polymer particles.

Production Example 7

A reaction vessel equipped with a stirrer, a condenser, a temperature controller and a nitrogen gas introducing tube was charged with 1,000 parts by weight of deionized water and heated to 80° C. with stirring. To the content, 205 parts by weight of the following initiator mixture and 25 parts by weight of methyl methacrylate were added and then the following monomer mixture was added dropwise for 120 minutes.

|  | Parts by weight |
|---|---|
| Initiator mixture |  |
| Ammonium peroxosulfate | 5 |
| Deionized water | 200 |
| Monomer mixture |  |
| Methacrylic acid | 10 |
| n-Butyl acrylate | 115 |
| Styrene | 200 |
| Neopentylglycol dimethacrylate | 150 |

After the completion of the addition, mixing was continued for 60 minutes to terminate the reaction. The resultant emulsion was a micro-gel dispersion having an average particle size of 0.53 micrometer. The emulsion was spray-dried to obtain polymer particles.

Production Example 8

A reaction vessel equipped with a stirrer, a condenser, a temperature controller and a nitrogen gas introducing tube was charged with 1,600 parts by weight of deionized water and heated to 80° C. with stirring. To the content, 205 parts by weight of the following initiator mixture and 50 parts by weight of methyl methacrylate were added and then the following monomer mixture and monomer aqueous solution were added dropwise for 120 minutes.

|  | Parts by weight |
|---|---|
| Initiator mixture |  |
| Ammonium peroxosulfate | 5 |
| Deionized water | 200 |
| Monomer mixture |  |
| Methyl methacrylate | 325 |
| n-Butyl acrylate | 100 |
| Neopentylglycol dimethacrylate | 25 |
| Monomer aqueous solution |  |
| N-(3-Sulfopropyl)-N-methacryloyloxyethyl-N,N-dimethyl ammonium betain | 5 |
| Deionized water | 200 |

After the completion of the addition, mixing was continued for 60 minutes to terminate the reaction. The resultant emulsion was a micro-gel dispersion having an average particle size of 0.40 micrometer. The emulsion was spray-dried to obtain polymer particles.

Production Example 9

A reaction vessel equipped with a stirrer, a condenser, a temperature controller and a nitrogen gas introducing tube was charged with 1,800 parts by weight of deionized water and heated to 80° C. with stirring. To the content, 205 parts by weight of the following initiator mixture and 25 parts by weight of methyl methacrylate were added and then the following monomer mixture was added dropwise for 120 minutes.

|  | Parts by weight |
|---|---|
| Initiator mixture |  |
| Ammonium peroxosulfate | 5 |
| Deionized water | 200 |
| Monomer mixture |  |
| Methyl methacrylate | 100 |
| n-Butyl acrylate | 100 |
| Styrene | 100 |
| 2-Ethylhexyl methacrylate | 75 |
| 2-Hydroxyethyl methacrylate | 40 |
| Dimethylaminopropylmethacrylamide | 10 |
| Ethyleneglycol dimethacrylate | 50 |

After the completion of the addition, mixing was continued for 60 minutes to terminate the reaction. The resultant emulsion was a micro-gel dispersion having an average particle size of 0.38 micrometer. The emulsion was spray-dried to obtain polymer particles.

Production Example 10

A reaction vessel equipped with a stirrer, a condenser, a temperature controller and a nitrogen gas introducing tube was charged with 1,000 parts by weight of deionized water and heated to 80° C. with stirring. To the content, 205 parts by weight of the following initiator mixture and 50 parts by weight of methyl methacrylate were added and then the following monomer mixture was added dropwise for 120 minutes.

|  | Parts by weight |
|---|---|
| Initiator mixture |  |
| Ammonium peroxosulfate | 5 |
| Deionized water | 200 |
| Monomer mixture |  |
| n-Butyl acrylate | 100 |
| Styrene | 200 |
| Ethyleneglycol dimethacrylate | 75 |
| Methacrylic acid | 75 |

After the completion of the addition, mixing was continued for 60 minutes to terminate the reaction. The resultant emulsion was a micro-gel dispersion having an average particle size of 0.48 micrometer. The emulsion was spray-dried to obtain polymer particles.

Production Example 11

A reaction vessel equipped with a stirrer, a condenser, a temperature controller and a nitrogen gas introducing tube was charged with 1,800 parts by weight of deionized water and heated to 80° C. with stirring. To the content, 205 parts by weight of the following initiator mixture and 50 parts by weight of methyl methacrylate were added and then the following monomer mixture was added dropwise for 120 minutes.

|  | Parts by weight |
|---|---|
| Initiator mixture |  |
| Ammonium peroxosulfate | 5 |
| Deionized water | 200 |
| Monomer mixture |  |
| Methyl methacrylate | 200 |
| n-Butyl acrylate | 100 |

-continued

|  | Parts by weight |
| --- | --- |
| 2-Hydroxyethyl methacrylate | 35 |
| Methacrylic acid | 15 |
| Divinylbenzene | 100 |

After the completion of the addition, mixing was continued for 60 minutes to terminate the reaction. The resultant emulsion was a micro-gel dispersion having an average particle size of 0.41 micrometer. The emulsion was spray-dried to obtain polymer particles.

Production Example 12

A reaction vessel equipped with a stirrer, a condenser, a temperature controller and a nitrogen gas introducing tube was charged with 1,800 parts by weight of deionized water and heated to 80° C. with stirring. To the content, 205 parts by weight of the following initiator mixture and 25 parts by weight of methyl methacrylate were added and then the following monomer mixture was added dropwise for 120 minutes.

|  | Parts by weight |
| --- | --- |
| Initiator mixture |  |
| Ammonium peroxosulfate | 5 |
| Deionized water | 200 |
| Monomer mixture |  |
| Methyl methacrylate | 125 |
| n-Butyl acrylate | 100 |
| Styrene | 150 |
| Ethyleneglycol dimethacrylate | 150 |
| 2-Sulfoethyl methacrylate | 0.5 |

After the completion of the addition, mixing was continued for 60 minutes to terminate the reaction. The resultant emulsion was a micro-gel dispersion having an average particle size of 0.51 micrometer. The emulsion was spray-dried to obtain polymer particles.

Example 1

Ten gram of the organic particles of Production Example 4 was uniformly dispersed in a solution of 30 g of styrene, 20 g of methyl methacrylate, 10 g of n-butyl acrylate and 40 g of ethyleneglylol dimethacrylate, in which 1 g of 2,2-azobis(2-methylpropylnitrile) was dissolved. It was then added dropwise with stirring to an aqueous solution of 900 g of deionized water and 5 g of Gosenol GH-17 (Nippon Synthetic Chemical Industry Co., Ltd.) to obtain a suspension. The obtained suspension was charged in a one liter reaction vessel equipped with a stirrer, a condenser, a temperature controller and a nitrogen gas introducing tube and heated to 80° C. with stirring for 30 minutes. Polymerization was conducted at 80° C. for 6 hours.

The resultant dispersion had a nonvolatile content of 10% by weight. It was filtered and dried to obtain crosslinked particles having an average particle size of 40 micrometer. The particles were observed by an electron microscope to find one or more hollows in the particles.

Example 2

Fifteen gram of the organic particles of Production Example 2 was uniformly dispersed in a solution of 40 g of styrene, 15 g of methyl methacrylate, 15 g of n-butyl acrylate and 30 g of ethyleneglylol dimethacrylate, in which 1 g of 2,2-azobis(2-dimethylvaleronitrile) was dissolved. It was then added dropwise with stirring at a high speed to an aqueous solution of 400 g of deionized water and 10 g of Gosenol NH-17 (Nippon Synthetic Chemical Industry Co., Ltd.) to obtain a suspension. The obtained suspension was charged in a 0.5 liter reaction vessel equipped with a stirrer, a condenser, a temperature controller and a nitrogen gas introducing tube and heated to 60° C. with stirring for 30 minutes. Polymerization was conducted at 60° C. for 6 hours.

The resultant dispersion had a nonvolatile content of 20% by weight. It was filtered and dried to obtain crosslinked particles having an average particle size of 3 micrometer. The particles were observed by an electron microscope to find one or more hollows in the particles.

Examples 3 to 18

Polymer particles were prepared as generally described in Example 1 using the ingredients as shown in Table 1. The particles were observed by an electron microscope to find one or more hollows in the particles. It also had been found that the void content and size of the hollows were widely varied by initiator amount, monomer (a) amount and organic particles (c) amount.

Comparative Example 1

One gram of 2,2-azobis(2-methylpropylnitrile) was dissolved in a solution of 30 g of styrene, 20 g of methyl methacrylate, 10 g of n-butyl acrylate and 40 g of ethyleneglylol dimethacrylate. It was then added dropwise with stirring to an aqueous solution of 900 g of deionized water and 0.5 g of Gosenol GH-17 (Nippon Synthetic Chemical Industry Co., Ltd.) to obtain a suspension. The obtained suspension was charged in a one liter reaction vessel equipped with a stirrer, a condenser, a temperature controller and a nitrogen gas introducing tube and heated to 80° C. with stirring for 30 minutes. Polymerization was conducted at 80° C. for 6 hours.

The resultant dispersion had a nonvolatile content of 10% by weight. It was filtered and dried to obtain crosslinked particles having an average particle size of 30 micrometer. The particles were observed by an electron microscope not to find any hollows in the particles.

Comparative Example 2

One gram of 2,2-azobis(2-dimethylvaleronitrile) was dissolved in a solution of 40 g of styrene, 15 g of methyl methacrylate, 15 g of n-butyl acrylate and 30 g of ethyleneglylol dimethacrylate. It was then added dropwise with stirring at a high speed to an aqueous solution of 400 g of deionized water and 3 g of Gosenol NH-20 (Nippon Synthetic Chemical Industry Co., Ltd.) to obtain a suspension. The obtained suspension was charged in a 0.5 liter reaction vessel equipped with a stirrer, a condenser, a temperature controller and a nitrogen gas introducing tube and heated to 60° C. with stirring for 30 minutes. Polymerization was conducted at 60° C. for 6 hours.

The resultant dispersion had a nonvolatile content of 20% by weight. It was filtered and dried to obtain crosslinked particles having an average particle size of 3 micrometer. The particles were observed by an electron microscope not to find any hollows in the particles.

TABLE 1

| Ex. No. | De-ionized water (g) | Monomer ingredients (g) | | | | | Others (g) | Organic particles (Pro. Ex. No.) (g) | Polymerization catalyst (g) | Dispersant (g) | Dispersion stabilizer (g) | Reaction temp. (°C.) | Average particle size[6] (μm) |
|---|---|---|---|---|---|---|---|---|---|---|---|---|---|
| | | EGDM[1] | NPGDM[2] | ST[3] | MMA[4] | nBA[5] | | | | | | | |
| 3 | 400 | 20 | — | 40 | 25 | 15 | — | 3 (5) | *A (5) | KM-11 (1) | — | 85 | 105 |
| 4 | 900 | 40 | — | 20 | 20 | 20 | — | 2 (30) | *B (0.3) | NH-20 (5) | — | 60 | 34 |
| 5 | 566 | — | — | 20 | 55 | 10 | *C (15) | 6 (15) | *D (1) | *E (5) | — | 80 | 52 |
| 6 | 300 | — | — | 30 | 30 | 10 | *C (30) | 4 (10) | *B (1) | GH-17 (10) | HPC-L[7] (2) | 60 | 21 |
| 7 | 900 | — | 25 | 25 | 40 | 5 | *F (5) | 5 (10) | *A (2) | GH-17 (10) | — | 85 | 5.3 |
| 8 | 900 | — | 30 | 35 | 20 | — | Methacryl amide (5) *G (10) | 4 (10) | *B (1) | KM-11 (10) | — | 60 | 11.5 |
| 9 | 900 | 40 | — | 20 | 20 | 20 | — | 7 (5) | *B (1) | GH-17 (10) | — | 65 | 12 |
| 10 | 900 | 40 | — | 20 | 20 | 20 | — | 7 (10) | *B (1) | GH-17 (10) | — | 65 | 12 |
| 11 | 900 | 40 | — | 20 | 20 | 20 | — | 7 (20) | *B (1) | GH-17 (10) | — | 65 | 13 |
| 12 | 900 | 40 | — | 20 | 20 | 20 | — | 7 (30) | *B (1) | GH-17 (10) | — | 65 | 15 |
| 13 | 900 | 40 | — | 20 | 20 | 20 | — | 8 (5) | *B (1) | GH-17 (10) | — | 85 | 85 |
| 14 | 900 | 40 | — | 20 | 20 | 20 | — | 8 (10) | *B (1) | KM-17 (10) | — | 60 | 93 |
| 15 | 900 | — | 30 | 20 | 20 | 20 | *G (10) | 9 (15) | *B (1) | GH-17 (5) | — | 65 | 32 |
| 16 | 400 | — | — | 40 | — | 30 | *C (20) *H (10) | 10 (10) | *A (2) | NH-20 (5) | — | 85 | 20 |
| 17 | 400 | — | 40 | 40 | — | 10 | Methacryl amide (10) | 11 (15) | *A (2) | NH-20 (5) | — | 85 | 40 |
| 18 | 400 | 40 | — | 20 | 20 | 20 | — | 12 (10) | *B (1) | GH-17 (5) | — | 65 | 65 |

[1] Ethyleneglycol dimethacrylate
[2] Neopentylglycol dimethacrylate
[3] Stylene
[4] Methyl methacylate
[5] n-Butyl acrylate
[6] Average particle size is visually determined by pictures of an electron microscope.
[7] Available from Nippon Soda Co., Ltd.
*A: t-Butylperoxy-2-ethyl hexanoate
*B: 2,2-Azobis(2,4-dimethylvaleronitrile)
*C: Divinylbenzene
*D: Benzoylperoxide
*E: Polyvinyl pyrolidone
*F: Dimetylaminopropyl methacrylamide
*G: 2-Hydroxyethyl methacrylate
*H: 2-Ethylhexyl methacrylate

What is claimed is:

1. A process for preparing composite hollow particles, comprising uniformly dispersing the following ingredients in an aqueous medium:
   (a) an ethylenically unsaturated monomer having at least two radical polymerizable non-conjugated double bonds in one molecule,
   (b) another polymerizable monomer which is different from the monomer (a),
   (c) organic crosslinked particles having an average particle size of 0.01 to 5 micrometer,
   (d) an initiator, and
   (e) a dispersant, and then dispersion-polymerizing the monomers, wherein the weight ratio of components (a) / (b) is within the range of 0.5/99.5 to 60/40, the organic particles (c) are present in an amount of 1 to 50% by weight based on the total weight of components (a) and (b), and dispersant (e) is present in an amount of 1 to 20% by weight, based on the total weight of the components (a) and (b).

2. The process according to claim 1 wherein said ethylenically unsaturated monomer (a) is selected from the group consisting of an ester of an unsaturated carboxylic acid and a polyhydric alcohol, an ester of a polybasic acid and an unsaturated alcohol and an aromatic compound substituted with at least two vinyl groups.

3. The process according to claim 1 wherein said monomer (a) is ethleneglycol diacrylate or ethyleneglycol dimethacrylate.

4. The process according to claim 1 wherein said polymerizable monomer (b) is selected from the group consisting of carboxylic group contains monomers, hydroxyl group-containing monomers, nitrogen-containing alkyl (meth)acrylate, unsaturated amides, unsaturated nitrile, unsaturated aromatic compounds and dienes.

5. The process according to claim 1 wherein said polymerizable monomer (b) is styrene, methyl methacrylate or n-butyl acrylate.

6. The process according to claim 1 wherein said organic particles (c) are prepared by emulsion polymerization.

7. The process according to claim 1 wherein said organic particles (c) are prepared by emulsion polymerization of methyl methacrylate, n-butyl acrylate, styrene and ethyleneglycol dimethacrylate.

8. The process according to claim 1 wherein said initiator is oil-soluble.

9. The process according to claim 1 wherein said initiator is selected from the group consisting of azo compounds and peroxides.

10. The process according to claim 1 wherein said dispersant (e) is selected from the group consisting of polyvinyl acetate or a modifier thereof, and a polymer dispersant having hydrophilic group and hyrophobic group(s).

* * * * *